July 15, 1941.  W. H. EDWARDS  2,249,351
VEHICLE
Filed Oct. 27, 1939
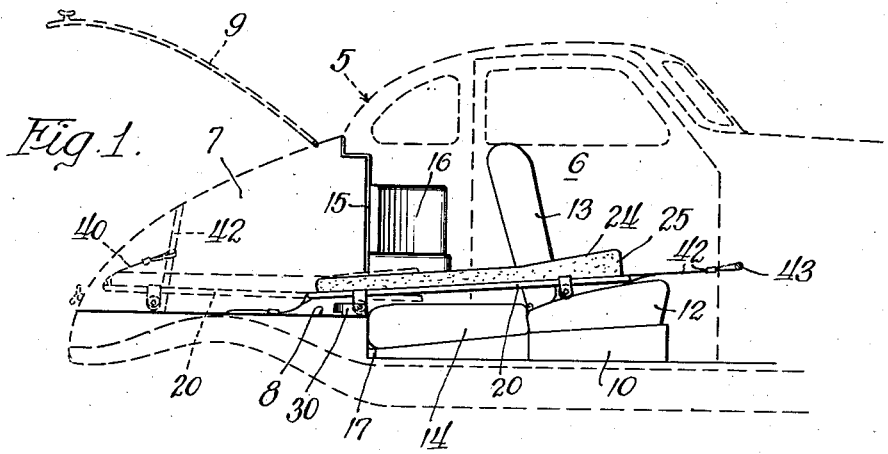
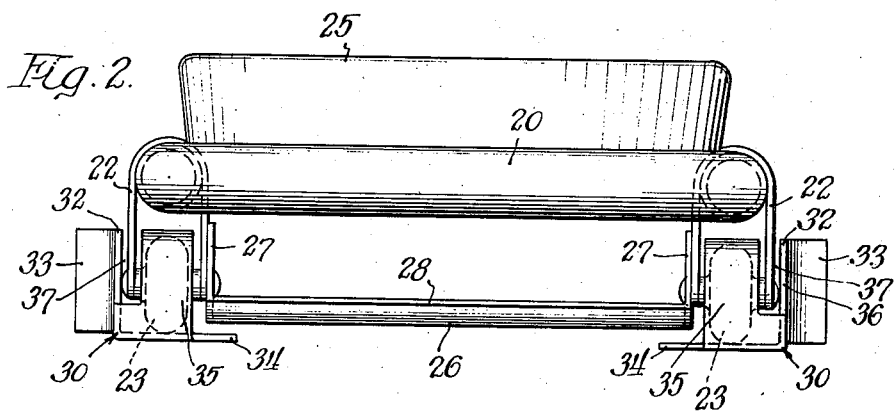
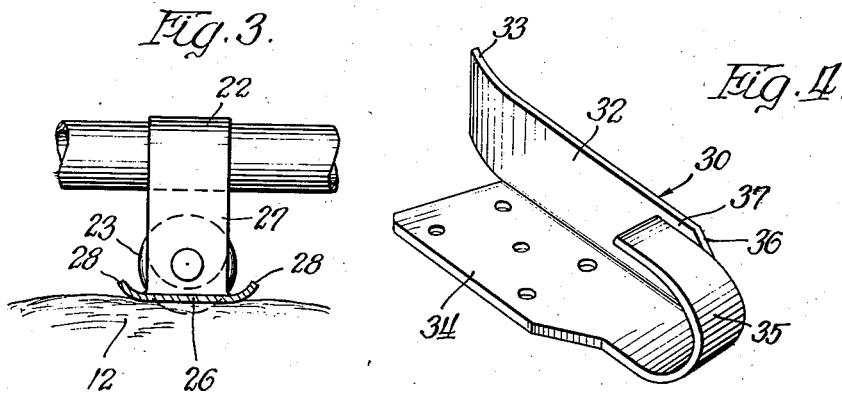
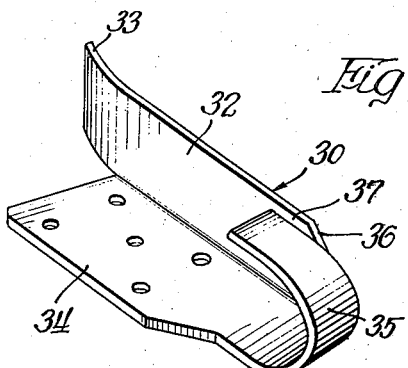
INVENTOR.
William Howard Edwards.
BY Walter E. Schirmer
ATTORNEY.

Patented July 15, 1941

2,249,351

UNITED STATES PATENT OFFICE 2,249,351

VEHICLE

William Howard Edwards, South Bend, Ind., assignor to Edwards Iron Works, Inc., South Bend, Ind., a corporation of Indiana Application October 27, 1939, Serial No. 301,567

10 Claims. (Cl. 296—19)

This invention relates to vehicles, and more particularly is directed to a means for converting the ordinary coupe type of vehicle into an emergency ambulance, being especially adaptable for use with police cars, traffic control cars and similar vehicles.

In a preferred form of the present invention it is contemplated to provide a structure in which the rear deck of the vehicle is arranged to open partially into the interior of the passenger compartment. The deck is of the conventional type, and in vehicles now in common use, is sufficient so as to accommodate storage of a standard size stretcher which has the forward end projecting partially into the rear of the passenger compartment when not in use.

The seat construction in the passenger compartment of the vehicle is so arranged that the seat back may be tilted rearwardly to close the space between the seat cushion and the rear deck, and to form a continuation of the surface therebetween in order to provide for moving the stretcher from its storage position into a position for use with the forward end thereof supported on the seat cushion.

One of the primary features of the present invention is the provision of means within the vehicle providing for a storage position of the stretcher when not in use and a position of the stretcher when in use whereby the stretcher will be in full view of the operator of the vehicle, and means is provided for accommodating an attendant in the rear of the driver's seat.

Still another feature of the present invention is the provision of means secured to the rear deck, and optionally engaged by the rollers at either the forward or rear end of the stretcher whereby the stretcher may be locked in fixed position for storage, and also when in use.

A still further feature of the present invention is the provision of common locking means for securing the stretcher against possible vertical or forward movement in either of its positions.

Another advantage of the present invention is the provision of means for insuring that the stretcher will remain in its desired position and will be locked against possible longitudinal, lateral or vertical movement in either such position.

Other objects and advantages of the present invention will be more apparent from the following detailed description which, taken in conjunction with the accompanying drawing, will disclose to those skilled in the art the particular construction and operation of a preferred form of the present invention.

In the drawing:

Figure 1 is a diagrammatic elevational view of a vehicle embodying the present invention;

Figure 2 is an end view showing the manner of supporting the rollers of the stretcher in locked position;

Figure 3 illustrates the manner of distributing the weight on the stretcher over an appreciable area of the seat cushion to avoid localized pressure contact of the rollers therewith; and Figure 4 is a perspective view of one of the guide and locking means.

Referring now in detail to the drawing, in Figure 1 a vehicle body has been indicated generally at 5 including a passenger compartment 6 and a rear deck compartment 7 having the rear deck 8 and the closure lid or trunk lid 9 which may be of conventional type.

Mounted in the passenger compartment 6 is a seat base upon which is mounted the forward seat cushion 12, the seat base 10 also providing support for the seat backs 13 and 14, which seat backs are normally hinged in such manner as to be tilted forwardly to provide for access to that portion of the passenger compartment rearwardly thereof.

In the conventional type of construction, the rear deck compartment 7 is separated from the seat or passenger compartment 6 by means of a vertical partition 15. To convert this type of vehicle for the present purposes, the partition 15 is cut away on one side thereof to allow a through passage between the compartments 6 and 7 and adjacent the unremoved part of the partition 15 there is provided an attendant's seat 16, which may be of any desired construction and may comprise a seat cushion mounted in the corner of the passenger compartment rearwardly of the driver's seat which would be immediately rearwardly of the seat back 13.

The opposite seat back is preferably arranged so that upon suitable manipulation, it may be tilted rearwardly into the position shown in Figure 1 with the rear upper edge thereof supported upon the block 17 so that it lies substantially in the plane of the deck 8. The type of hinging arrangement to accommodate this rearward tilting of the seat back 14 can be that shown in my copending application, Serial No. 293,687, filed September 7, 1939, or may be of some other type suitable for this purpose inasmuch as it is desirable that the seat back 14 be restrained against rearward tilting when the vehicle is in normal use.

From the foregoing description, it will be apparent that there is provided in the vehicle a longitudinal passageway defined by the rear deck 8, the seat back 14, and the seat cushion 12, which is of an appreciably greater length than the conventional length of a stretcher and which is disposed along one side of the compartments 6 and 7 so as to allow the placing of an attendant upon a seat 16 to take care of patients which may be carried in the vehicle. This passageway is of sufficient vertical extent as to allow the movement of the stretcher therethrough with a patient thereon, and preferably, the arrangement is such that when the stretcher is in storage position in the rear deck, the forward end thereof projects only a slight distance forwardly of the opening in the partition 15.

Considering now the stretcher in detail, this stretcher comprises a rectangular frame 20 which may be formed of tubing or the like having rounded corners and being of an appreciable length with respect to its width. The side rails of the frame 20 are provided with inverted U-shaped clips 22, shown more in detail in Figures 2 and 3, which clips are secured either by screws, welding or the like in non-rotative position on the frame, and which carry between the extending arms thereof the roller members 23. The stretcher is provided with a suitable spring supported webbing or the like extending both longitudinally and laterally between the side rails and end rails, upon which is supported the mattress or pad 24 having the thickened head end portion 25. It will be noted that the clips 22 are so arranged to provide fore and aft sets of rollers which are spaced from the end portions of the frame.

The forward set of rollers, as shown clearly in Figures 2 and 3, have disposed therebetween the transversely extending plate member 26 which is welded or otherwise secured to the adjacent inner arms of the respective clips 22 by means of flanges 27. The plate 26 has rounded lateral edges 28 which are turned upwardly so that as the forward end of the stretcher is moved over the seat back 14 and onto the seat cushion 12, there will be no tendency of these edges to dig into the upholstery of the seat. The plate 26 provides a very large surface area resting on the seat cushion 12 so as to distribute the weight upon the stretcher frame over this area to prevent damage to the upholstery or cushioning material in the seat cushion. It will be noted that the lower edge of the plate 26 is disposed only a slight distance above the engaging surfaces of the rollers 23 so as to prevent the rollers from digging into the seat cushion.

Mounted in laterally spaced relation on the surface of the deck 8 adjacent the forward end thereof are members 30, which are shown more in detail in Figure 4. Each of the members 30 comprises a vertically extending die flange 32 which is flared outwardly at its rear end, as indicated at 33. A supporting base portion 34 is provided on each of the members 30 which is suitably apertured to receive securing means for rigidly supporting the same on the surface of the deck 8. At the forward end of the base portion 34 there is an arcuately upwardly and rearwardly curved portion 35 which is of a radius substantially equivalent to the radius of the rollers 23. The portion 35 is of reduced width so as to provide a slot or groove between this curved portion and the cut-away portion 36 of the forward end of the side wall 32. This slot is indicated at 37 in Figures 2 and 4.

In the operation of the construction thus far described, the stretcher frame 20 is normally disposed in stored position, as indicated in dotted lines in Figure 1. In this position the forward set of rollers are engaged between the vertically extending walls 32 of the members 30 with the rollers 23 thereof engaged within the curved portions 35 of these members, which restrain the rollers against either forward or vertical movement. This maintains the forward edge of the stretcher against movement outwardly from the deck compartment, and also prevents it from rattling. The stretcher frame is restrained against lateral movement by engagement of the clip members in the grooves 37 whereby the side walls 32 of the members 30 confine the stretcher frame laterally so that the entire forward end of the stretcher frame is rigidly locked against movement.

To maintain the frame in locked position with respect to the members 30, a suitable strap 40 is secured to the rear end of the strecther frame and is buckled to a suitable frame member 42 in the rear deck in such manner as to exert a forward thrust on the stretcher frame, securely holding the rollers 23 in locked position in the members 30.

When it is desired to use the stretcher, the strap 40 is released, allowing rearward movement of the stretcher frame to disengage the rollers 23 from the members 30. The forward end of the stretcher is then raised so that the rollers pass above the members 30 and the stretcher is then moved forwardly into the full line position shown in Figure 1 with the rear rollers 23 being guided between the flared ends 33 of the members 30 into locking engagement at the forward ends of these members in the same manner as were the forward rollers 23 when the stretcher was in stored position. This locks the rear end of the stretcher frame securely against forward lateral or vertical movement, and to insure the maintenance of the stretcher in this position, a second strap 42 is provided at the front end of the frame and extends forwardly for connection about a suitable frame member 43 carried under the cowl or instrument board of the vehicle. The tensioning of the strap 42 maintains the rear rollers in locked position, and holds the stretcher firmly against movement while it is supported on the seat cushion 12 and the forward edge of the rear deck 8. In this position, an attendant can be seated on the seat 16 to take care of the patient on the stretcher, and the driver of the vehicle sits laterally of the stretcher and has full room for operating the vehicle.

It is therefore believed apparent that I have provided a novel type of stretcher and locking construction for adaptation of a vehicle of this type to render the same easily convertible into an emergency ambulance and to insure positive location of the stretcher in each of its positions against rattling or shifting movement. In this connection, the internal surface of the curved portions 35 of the members 30 may be lined with a suitable cushioning material, such as felt, rubber or the like to prevent any rattling of the rollers within this curved locking flange.

I am aware that various changes may be made in certain details of the construction herein shown and described, and I therefore do not intend to be limited except as defined by the scope and spirit of the appended claims.

I claim:

1. In a vehicle having a rear deck, a front seat, a seat back therefor adapted to be tilted rearwardly to form a substantially horizontal continuation between said seat and deck, a stretcher frame having longitudinally spaced pairs of rollers carried by the side frames thereof, means secured to said deck near the forward edge thereof for receiving either pair of said rollers and locking the same against forward or upward movement, and means at each end of said stretcher for pulling the same into a position to hold the remote pair of rollers in engagement in said locking means.

2. A vehicle of the coupé type adapted to be converted into an emergency ambulance and including a rear deck opening into the front seat compartment, a front seat cushion, a seat back normally tiltable forwardly but adapted to be tilted rearwardly so as to form a continuation between the rear deck and seat cushion, a rectangular stretcher having laterally spaced forward rollers and laterally spaced rear rollers, means carried adjacent the forward end of said rear deck locking said forward rollers against forward or vertical movement, when said stretcher is not in use, said stretcher being releasable to move to a forward position with said rear rollers locked in said means, and means for holding said stretcher in said last-named position secured to the forward end of the stretcher.

3. The combination, with a coupé type vehicle having a rear deck, and a seat back adapted to be tilted rearwardly to form a continuation of the deck to the seat cushion, of a stretcher comprising a rigid rectangular frame having fore and aft sets of rollers carried in inverted U-shaped clips secured to said frame, a transverse dependent supporting plate between the forward set of rollers for supporting the forward end of said frame on said seat cushion when in use, and means rigidly secured to said deck in which either set of rollers may engage to lock the same against forward or vertical movement.

4. The combination of claim 3 further characterized by means at each end of said stretcher adapted to optionally engage said vehicle body for holding said stretcher in position to maintain either set of said rollers in engagement with said locking means.

5. The combination, with a coupé type vehicle having a rear deck, and a seat back adapted to be tilted rearwardly to form a continuation of the deck to the seat cushion, of a stretcher comprising a rigid rectangular frame having fore and aft sets of rollers, a transverse dependent supporting plate between the forward set of rollers for supporting the forward end of said frame on said seat cushion when in use, and means rigidly secured to said deck in which either set of rollers may engage to lock the same against forward or vertical movement.

6. The combination, with the rear deck of a vehicle body, of a stretcher adapted to be carried in said deck when not in use, comprising a rigid rectangular frame having a set of laterally spaced rollers adjacent each end thereof, means carried adjacent the forward end of said deck for guiding said rollers upon longitudinal movement of said frame and including means locking the forward set of rollers against forward or vertical movement, and a strap at the rear end of said frame arranged to connect to a part of said vehicle body for urging said frame forwardly to maintain said forward rollers in said locking means.

7. The combination, with a vehicle body having a rear deck, a seat cushion, and a seat back arranged for rearward tilting into the space between said seat cushion and deck, of a rigid stretcher adapted to be stored in said dock when not in use and comprising a rectangular frame carrying fore and aft sets of rollers beneath the side rails thereof, guide means secured to said deck for receiving the rear set of rollers when said frame is moved forwardly over said seat back and cushion including means locking said set of rollers against vertical or forward movement, and means tensioned between the forward end of said frame and said body holding said rollers in said locking means.

8. The combination of claim 7 further characterized in the provision of a transverse plate between the forward set of rollers disposed in a plane slightly above the lower edge of said rollers for supporting the weight on said frame over a considerable area of said seat cushion.

9. In combination with a vehicle having a rear deck, a seat cushion, and a rearwardly tiltable seat back forming a continuation therebetween, a stretcher adapted to lay across said deck, back and cushion and having dependent rollers, and guide and lock means for said rollers secured to said deck in laterally spaced relation, each comprising a vertical portion flaring outwardly at the rear end between which said rollers are laterally confined, and a base portion terminating at its forward end in an arcuate portion of a radius such as to receive said rollers and of an extent such as to confine said rollers vertically.

10. The combination of claim 9 wherein said arcuate portion is cut away adjacent the vertical portion to provide an open slot therebetween.

WILLIAM HOWARD EDWARDS.